US007950052B2

United States Patent
Lie et al.

(10) Patent No.: US 7,950,052 B2
(45) Date of Patent: May 24, 2011

(54) SYSTEM, METHOD, AND INTERFACE FOR SEGREGATION OF A SESSION CONTROLLER AND A SECURITY GATEWAY

(75) Inventors: Milton A. Lie, McKinney, TX (US); Ben A. Campbell, Irving, TX (US)

(73) Assignee: Audiocodes, Inc., Plano, TX (US)

( * ) Notice: Subject to any disclaimer, the term of this patent is extended or adjusted under 35 U.S.C. 154(b) by 770 days.

(21) Appl. No.: 11/626,767

(22) Filed: Jan. 24, 2007

(65) Prior Publication Data

US 2007/0283412 A1    Dec. 6, 2007

Related U.S. Application Data

(60) Provisional application No. 60/761,924, filed on Jan. 25, 2006.

(51) Int. Cl.
*H04L 12/12* (2006.01)
*H04W 4/00* (2009.01)
*H04H 20/71* (2008.01)

(52) U.S. Cl. ........... 726/12; 726/13; 726/14; 726/15; 709/227; 709/228; 709/229; 370/252; 370/310

(58) Field of Classification Search .............. 726/12–15; 370/252, 310–350; 709/227–229
See application file for complete search history.

(56) References Cited

U.S. PATENT DOCUMENTS 7,280,826 B2 * 10/2007 Nylander et al. .............. 455/433
2005/0135375 A1 * 6/2005 Hurtta et al. ............... 370/395.2
2006/0262778 A1 * 11/2006 Haumont et al. ............. 370/356
2006/0265504 A1 * 11/2006 Taaghol et al. ............... 709/227
2006/0268729 A1 * 11/2006 Huang et al. ................. 370/252

OTHER PUBLICATIONS

Alcatel, AT&T Wireless Services, Inc. et al., Technical Specification, Unlicensed Mobile Access (UMA); Architecture (Stage 2); UMA Architecture (Stage 2) R1.0.2 (Nov. 3, 2004), pp. 1-79.
Alcatel, AT&T Wireless Services, Inc. et al., Technical Specification, Unlicensed Mobile Access (UMA); Protocols (Stage 3); UMA Architecture (Stage 3) R1.0.2 (Nov. 5, 2004), pp. 1-142.

* cited by examiner

*Primary Examiner* — Taghi T. Arani
*Assistant Examiner* — Madhuri Herzog
(74) *Attorney, Agent, or Firm* — Haynes and Boone LLP

(57) ABSTRACT

A system, method, and interface for segregating a network controller and a security gateway is provided. A security gateway-network controller interface is established between a security gateway and a network controller. One or more application interfaces are carried over the security gateway-network controller interface. An admission policy interface may be maintained on the security gateway-network controller interface that allows establishment of dynamic access control lists for admission policies applied on specific secure tunnels. Additionally, a security association-international mobile subscriber identity interface may be maintained on the security gateway-network controller interface that facilitates ensuring an IMSI used during a registration process matches an identity used to establish a tunnel. Thus, a subscriber validation mechanism is provided over the security gateway-network controller interface that couples the network controller and the security gateway.

20 Claims, 10 Drawing Sheets

800

| Length 810 | Type 820 | Payload 830 |

| 2 | 2 | 4 | 4 | 4 | | 4 | 4 |
|---|---|---|---|---|---|---|---|
| Version 902 | Add. Domain 904 | SGW Public Address 906 | Range 1 Start 908a | Range 1 End 910a | ..... | Range n Start 908n | Range n End 910n |

| Status 1002 | Version 1004 | Heartbeat Expiration 1006 |

| Add. Domain 1102 | Tunnel Address 1104 |

| Tunnel Addr 1202 | MS Address 1204 | IMSI 1206 |

| Add Domain 1302 | Tunnel Address 1304 |

| Add Domain 1402 | Tunnel Address 1404 |

| Transaction ID 1502 | Add Domain 1504 | Operation 1506 | Rule 1508 |

| Transaction ID 1602 | Status 1604 |

Figure 16

SYSTEM, METHOD, AND INTERFACE FOR SEGREGATION OF A SESSION CONTROLLER AND A SECURITY GATEWAY

RELATED APPLICATION DATA

This patent application claims the benefit of provisional U.S. Patent Application Ser. No. 60/761,924, filed Jan. 25, 2006.

BACKGROUND

Unlicensed Mobile Access (UMA) technologies provide access to cellular networks and services, such as Global System for Mobile communications (GSM) networks and general packet radio service (GPRS), over unlicensed spectrum technologies, such as Bluetooth and wireless local area networks implemented in conformance with the Institute of Electrical and Electronic Engineers (IEEE) 802.11 standards. UMA systems allow subscribers to roam with dual-mode mobile stations (MSs) between cellular networks and public and private unlicensed wireless networks.

A UMA network controller (UNC) deployed in a UMA network appears as a base station subsystem and provides corresponding functionality thereof. In conventional UMA architectures, a security gateway (SGW) is integrated with the UNC and terminates secure remote access tunnels from an MS and provides authentication services as well as other services.

The integration of a UNC and SGW within a common network entity introduces disadvantages with regard to network planning, deployment, and performance. For example, implementation of UNC and SGW services within a common network node poses scaling issues with regard to network capacity and expansion. Additionally, deployment of new or enhanced security services that may be provided by a SGW requires the mutual deployment of a UNC regardless of whether any network control performance or enhancement is realized.

BRIEF DESCRIPTION OF THE DRAWINGS

Aspects of the present disclosure are best understood from the following detailed description when read with the accompanying figures, in which:

FIG. 8 is a diagrammatic representation of an embodiment of an exemplary format of a security gateway-unlicensed mobile access network interface message;

FIG. 9 is a diagrammatic representation of a format of a payload field that may be implemented for a Range-Set message;

FIG. 10 is a diagrammatic representation of a format of a payload field that may be implemented for a Configuration message;

FIG. 11 is a diagrammatic representation of a format of a payload field that may be implemented for a Tunnel-Query message;

FIG. 12 is a diagrammatic representation of a format of a payload field that may be implemented for a Tunnel-Info message;

FIG. 13 is a diagrammatic representation of a format of a payload field that may be implemented for a Tunnel-Out-of-Range message;

FIG. 14 is a diagrammatic representation of a format of a payload field that may be implemented for a Tunnel-Release message;

FIG. 15 is a diagrammatic representation of a format of a payload field that may be implemented for a Policy Request message of an Admission Policy interface;

FIG. 16 is a diagrammatic representation of a format of a payload field that may be implemented for a Policy Response message of an Admission Policy interface;

DETAILED DESCRIPTION

Figure 1:
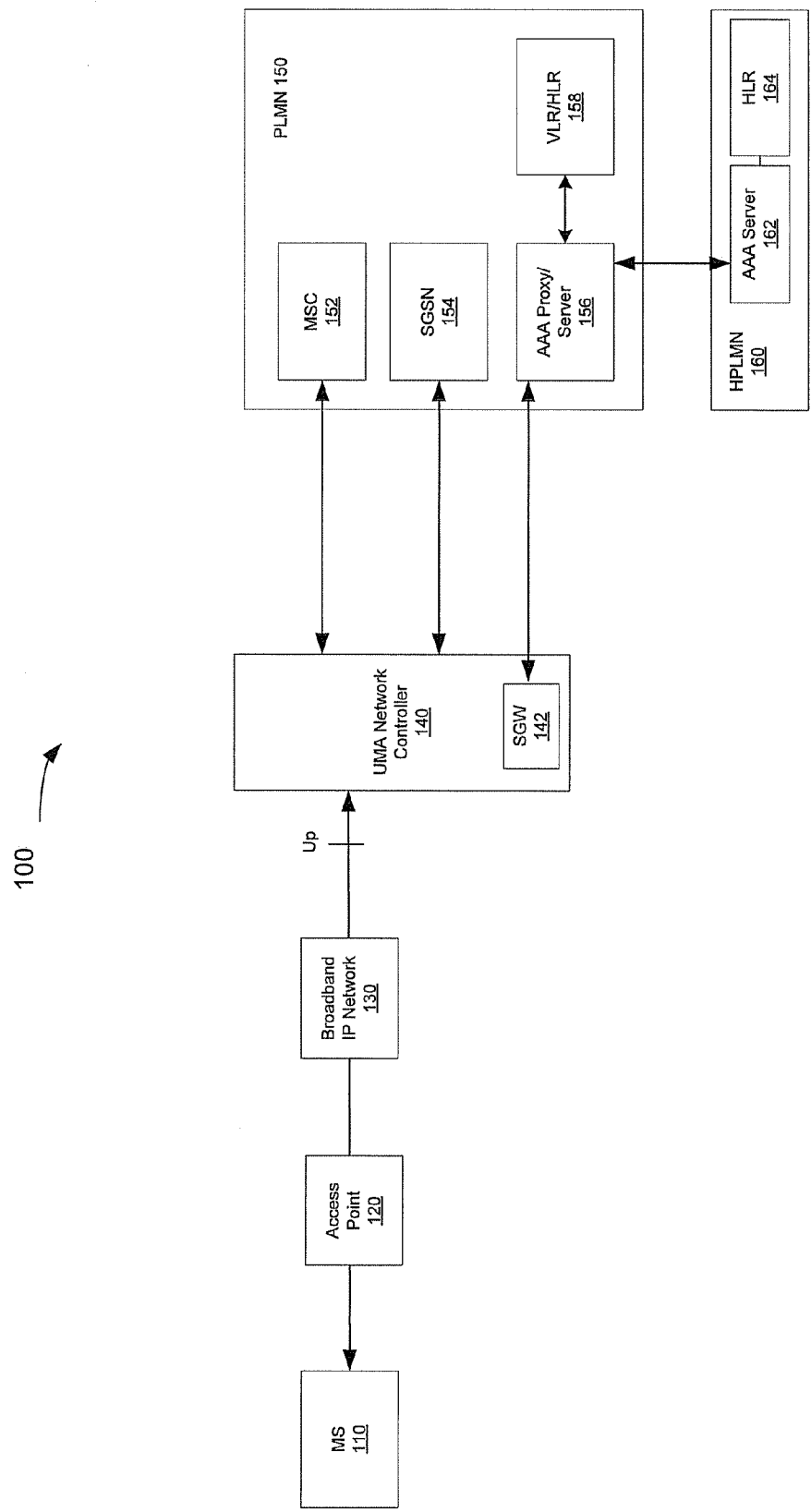
FIG. 1 is a diagrammatic representation of an unlicensed mobile access network in which embodiments disclosed herein may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of an unlicensed mobile access (UMA) network 100 in which embodiments disclosed herein may be implemented.

A mobile station (MS) 110 connects with network 100 by way of an access point (AP) 120 that is interconnected with a broadband Internet protocol (IP) network 130. MS 110 may be implemented as a dual-mode mobile station that is adapted to connect with a cellular radio access network, such as a global system for mobile stations (GSM) mobile network, or another radio access network, and an unlicensed mobile access (UMA) network, such as a network implemented in conformance with an IEEE 802.11x standard. AP 120 provides a radio link to MS 110 on an unlicensed radio spectrum. IP network 130 interfaces with a UMA network controller (UNC) 140. An interface—the Up interface—is defined between UNC 140 and MS 110. In accordance with conventional network configurations, UNC 140 includes a security gateway (SGW) 142 integrated therewith. Security gateway 142 establishes and terminates an IP security (IPsec) connection between MS 110 and SGW 142. That is, SGW 142 establishes and terminates a secure tunnel between MS 110 and SGW 142.

Various interfaces may be established between UNC 140 and a public land mobile network (PLMN) 150, such as a visited public land mobile network (VPLMN) or a home public land mobile network (HPLMN). An A-interface for circuit switched services may be established between UNC 140 and a mobile switching center (MSC) 152 of PLMN 150 for circuit switched services, and a Gb interface may be established between UNC 140 and a serving general packet radio service (GPRS) support node (SGSN) 154 for packet switched services.

A Wm interface may be established between SGW 142 and an authentication, authorization, and accounting server 156 that interfaces with a location register 158, e.g., a visitor location register (VLR) and/or home location register (HLR) that provide for transaction control, e.g., call processing, and user service, such as mobility and location support.

AAA server 156 may interface with another AAA server 162 in another PLMN 160 to support roaming of MS 110 between various mobile networks. AAA server 162 may interface with a location register 164 of PLMN 160. In general, PLMN 160 may be configured similar to PLMN 150. The various interfaces depicted in FIG. 1 may be implemented in accordance with UMA and/or 3GPP specifications or standards.

Figure 2:
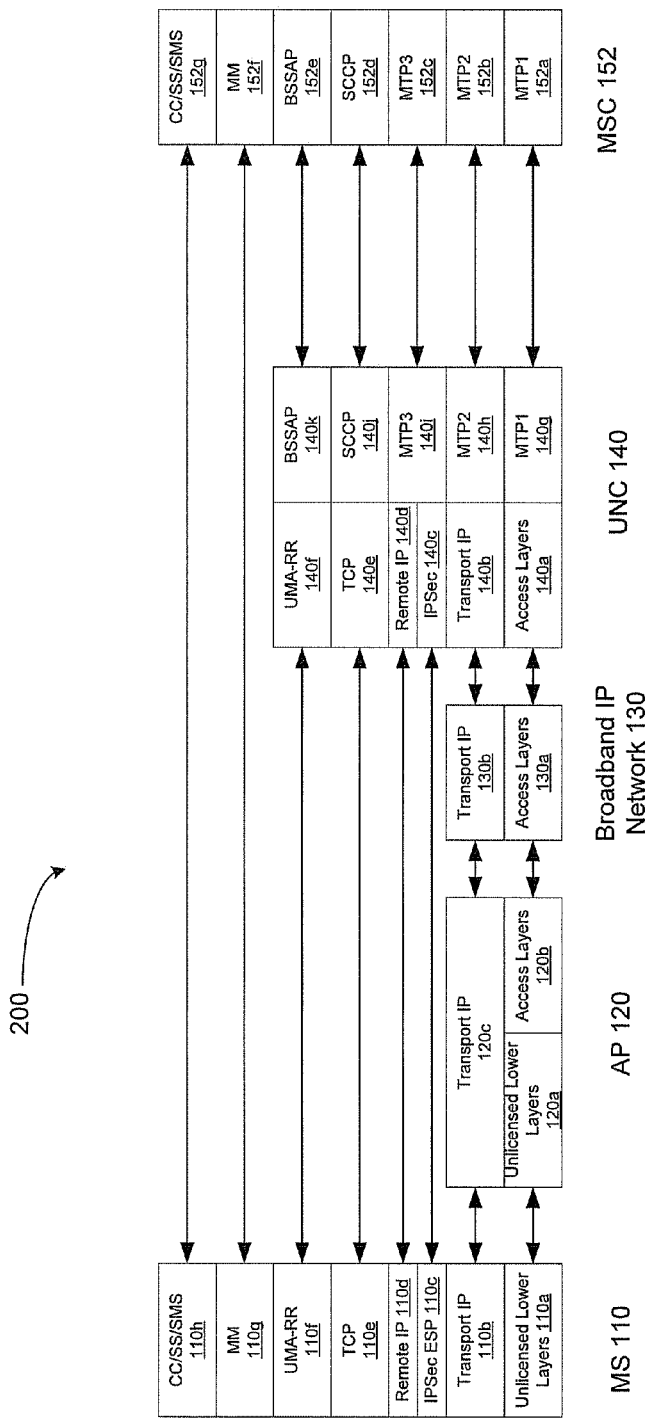
FIG. 2 is a diagrammatic representation of an embodiment of a software configuration of various entities that may be deployed or connected in an unlicensed mobile access network.

FIG. 2 is a diagrammatic illustration of an embodiment of a software configuration of various entities that may be deployed or connected in network 100.

MS 110 connects with network 100 on a physical media by way of an unlicensed lower layer 110a, such as an unlicensed radio spectrum provided in accordance with an 802.11x standard. Unlicensed lower layer 110a may interface with a corresponding unlicensed lower layer 120a of AP 120. MS 110 is configured with a transport 110b that interfaces with a transport IP 120c of AP 120. An IPsec encapsulating security payload (ESP) layer 110c and a remote IP 110d respectively interface with an IPsec ESP layer 140c and remote IP 140d of UNC 140. ESP layers 110c and 140c provide an IPsec protocol tunnel mode. Remote IP 110d and 140d layers provide an independent IP session inside an encrypted channel. A transmission control protocol (TCP) layer 110e and a UMA radio resource (RR) layer 110f of MS 110 respectively interface with a corresponding TCP layer 140e and a UMA-RR layer 140f of UNC 140. A mobility management (MM) layer 110g and a call control (CC)/supplementary services (SS)/short message service (SMS) layer 110h of MS 110 respectively interface with an MM layer 140l and a CC/SS/SMS layer 140m of MSC 152. In this manner, radio access network protocols, such as GSM MM protocols, radio access call control protocols, and the like are carried transparently between the MS and MSC over the UMA network.

Access layers 120b and transport IP layer 120c of AP 120 interface with respective access layers 130a and transport IP layer 130b of broadband IP network 130 that, in turn, interface with respective access layers 140a and transport IP layer 140b of UNC 140. Message transfer part (MTP) layers 1-3 140g-140i of UNC 140 respectively interface with corresponding message transfer part layers 1-3 152a-152c of MSC 152. Likewise, signaling connection control part (SCCP) layer 140j and base station system application part (BSSAP) 140k of UNC 140 interface with a corresponding SCCP layer 152d and a BSSAP layer 152e of MSC 152. The various layers depicted in FIG. 2 may interact with adjacent layers of a stack by way of application program interfaces (API) or other suitable mechanisms.

Figure 3:
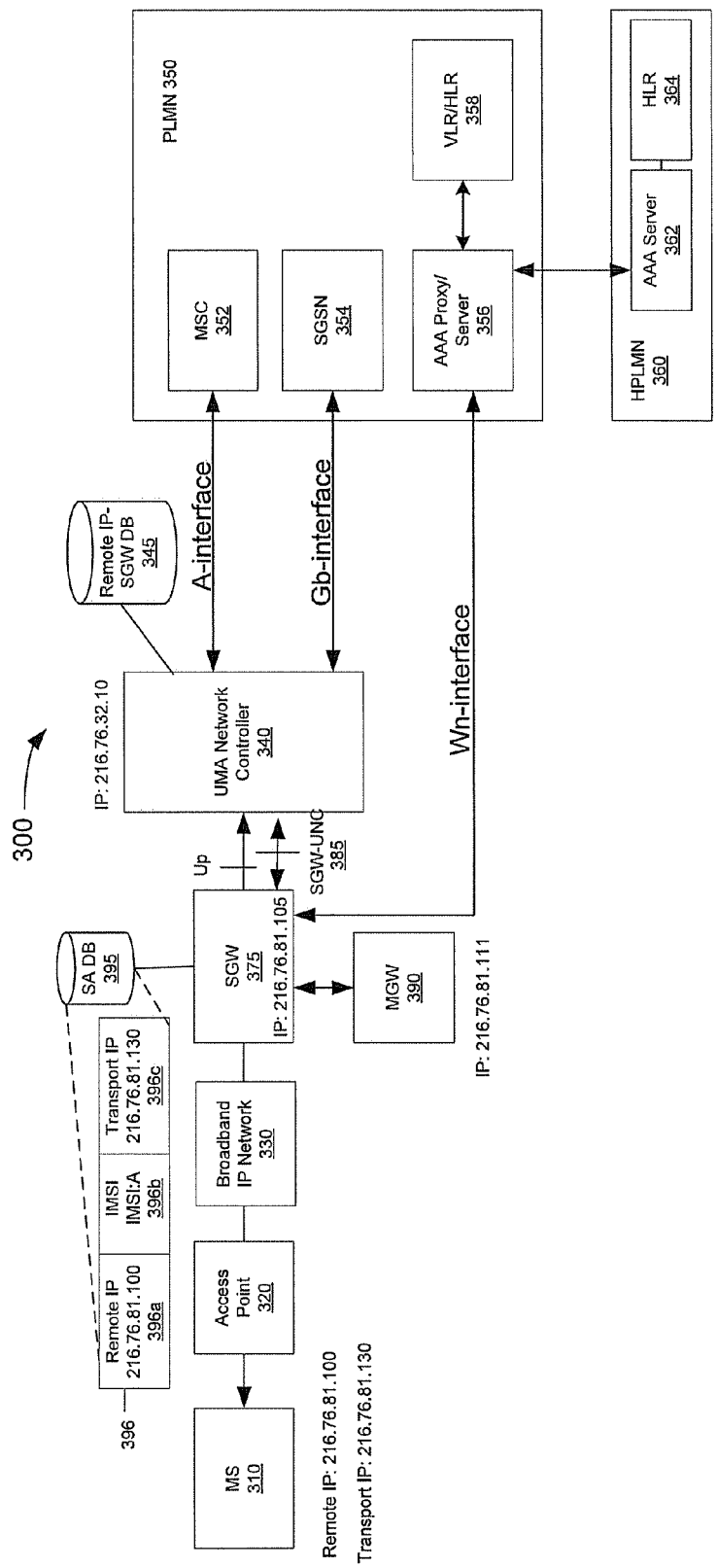
FIG. 3 is a diagrammatic representation of an embodiment of a unlicensed mobile access network featuring segregation of a network controller and a security gateway.

FIG. 3 is a diagrammatic representation of an embodiment of a UMA network 300 featuring segregation of a network controller 340 and a security gateway 375. UNC 340 and SGW 375 are configured with an SGW-UNC interface 385 therebetween that facilitates validation of subscriber stations during station registration and dynamic security session functions as described more fully hereinbelow.

An MS 310 connects with network 300 by way of an unlicensed radio link with AP 320 that is interconnected with a broadband IP network 330. MS 310 may be implemented as a dual mode mobile station that is adapted to connect with a cellular radio access network and a UMA network. IP network 330 interfaces with SGW 375 that is interconnected with UNC 340 over a Up interface. Additionally, SGW 375 and UNC 340 share an SGW-UNC interface 385 over which one or more application interfaces may be deployed in accordance with embodiments described more fully hereinbelow.

Various interfaces are established between UNC 340 and PLMN 350. An A-interface is established between UNC 340 and a MSC 352 of PLMN 350 for circuit switched services, and a Gb interface is established between UNC 340 and an SGSN 354 for packet switched services. A Wm interface may be established between SGW 375 and an AAA server 356 that interfaces with a location register 358.

In accordance with an embodiment, UNC 340 and security gateway 375 are segregated. SGW-UNC interface 385 provides a communication mechanism between UNC 340 and SGW 375 that facilitates exchange of data for validation of subscriber stations. While FIG. 3 shows UNC 340 and SGW 375 directly connected, such a configuration is illustrative only and is intended only to facilitate an understanding of the embodiments disclosed herein. UNC 340 and SGW 375 may be communicatively coupled by way of a network, such as a LAN or public network such as the Internet. Accordingly, UNC 340 and SGW 375 may be disposed at geographically remote locales. In other implementations, however, UNC 340 and SGW 375 may be segregated but commonly located at a particular site. For example, UNC 340 and SGW 375 may be implemented as distinct network components commonly disposed in a network rack system. In such an implementation, UNC 340 and SGW 375 may be directly connected.

SGW 375 establishes and terminates an IPsec connection between MS 310 and SGW 375. To this end, SGW 375 may maintain or interface with a security association (SA) database (DB) 395 or other data structure that records information related to security associations. For example, SA DB 395 may maintain records that provide an association between respective MS identities, logical addresses such as transport addresses assigned to MSs, and remote IP addresses mutually associated with MSs and secure tunnels.

AAA server 356 may interface with another AAA server 362 in another PLMN 360 to support roaming of MS 310 between various mobile networks. AAA server 362 may interface with a location register 364 of PLMN 360. In general, PLMN 360 may be configured similar to PLMN 350. FIG. 3 is intended as an example, and not as an architectural limitation, of embodiments described herein. For example, network 300 may be implemented in accordance with 3GPP standards, and UNC 340 may be implemented as a session control function. Other various implementations of network 300 are possible without deviating from embodiments disclosed herein.

Figure 4:
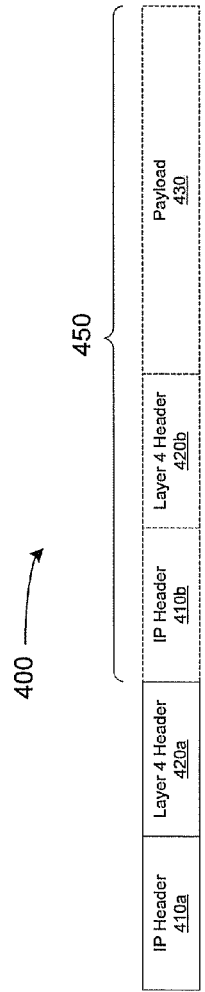
FIG. 4 is a diagrammatic representation, of an embodiment of an IPsec data structure that may be used for secure data exchanges between a mobile station and a security gateway.

FIG. 4 is a diagrammatic representation of an embodiment of an IPsec data structure 400 that may be used for secure data exchanges between MS 310 and SGW 375. Data structure 400 comprises an IP header 410a and a layer 4 header 420a, such as a TCP header, a user datagram protocol (UDP) header, or another suitable layer 4 header. IP header 410a and layer 4 header 420a may include various fields containing data that are outside the scope of embodiments disclosed herein and may be implemented as are known in the art unless otherwise expressly stated. Notably, IP header 410a contains a source IP address and a destination IP address. When data structure 400 is originated by MS 310, a source address field contained in IP header 410a contains a logical address assigned by a network access point, such as access point 320, or another entity through which MS 310 gains access to network 300, and a destination address field of IP header 410a contains an IP address assigned to SGW 375. As referred to herein, a source and destination address of IP header 410a are respectively referred to as a transport source IP address and a transport destination IP address (collectively referred to as transport addresses).

A payload field 450 includes an encrypted packet that comprises an encrypted IP header 410b, and encrypted layer 4 header 420b, and an encrypted payload field 430 that may carry encrypted user data, e.g., encrypted voice data. Encrypted IP header 410b includes a remote IP address assigned to MS 310 that is managed by SGW 375. Data received by SGW 375 that is addressed to MS 310 includes a destination address assigned as the remote IP address. For example IP packets received by SGW 375 destined for delivery to MS 310 include a destination address that is set to the remote IP address of MS 310. SGW 375 performs an address mapping to resolve the IP address of MS 310 from the remote IP address of MS 310. SGW 375 then encrypts any data to be delivered to MS 310 and tunnels the data thereto.

When the SGW receives data formatted according to structure 400 from MS 310 for delivery to another entity, SGW strips off headers 410a and 420a, decrypts the encrypted packet of payload field 450, and sends the decrypted packet into the core network for delivery to the destination.

Figure 5:
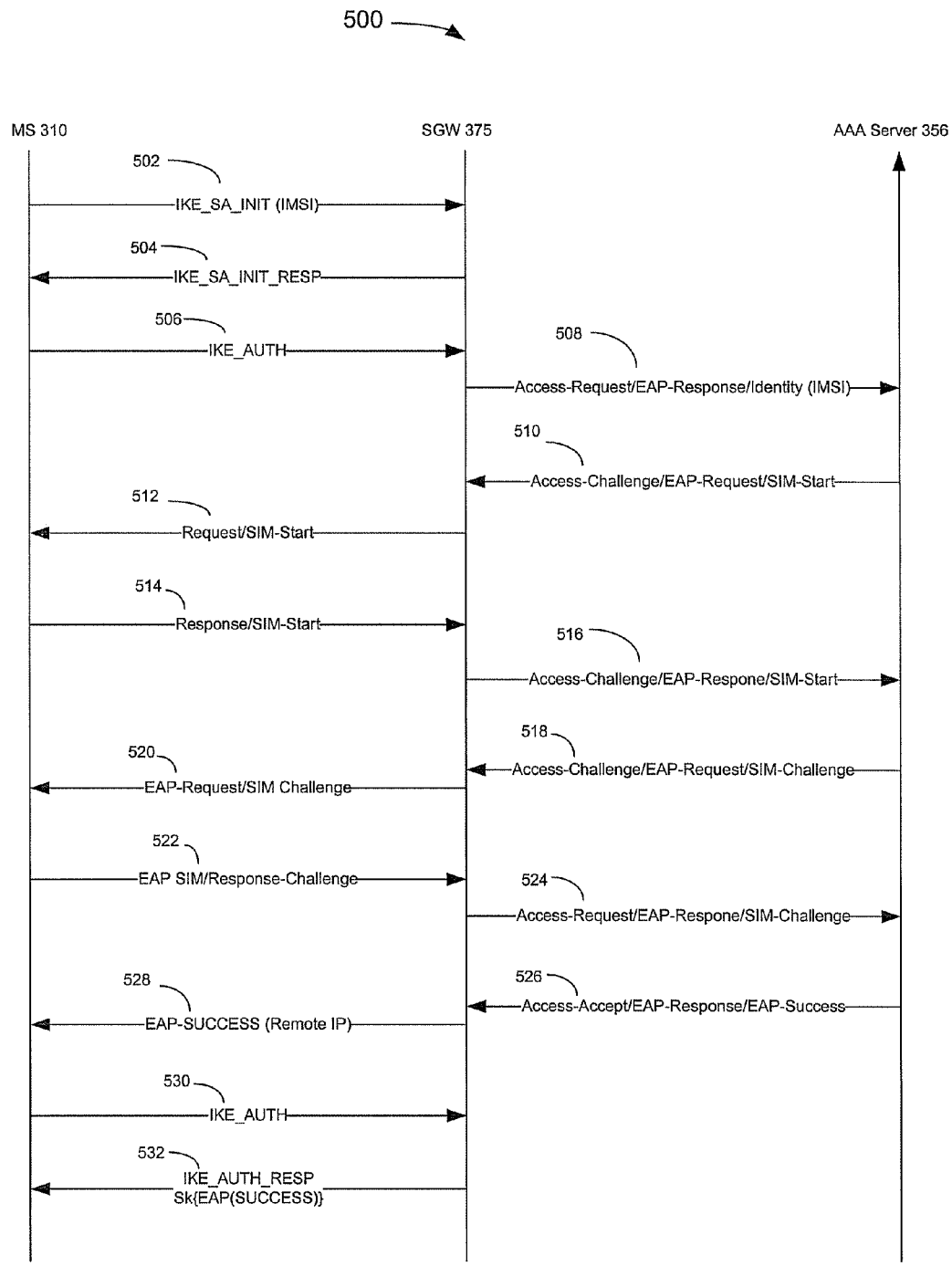
FIG. 5 is a diagrammatic representation of an embodiment of a signaling flow for establishment of a secure IPsec tunnel between a mobile station and a security gateway.

FIG. 5 is a diagrammatic representation of an embodiment of a signaling flow 500 for establishment of a secure IPsec tunnel between an MS and an SGW. Signaling depicted in FIG. 5 is performed after the MS has associated with an AP. In the illustrative example, assume MS 310 is associated with AP 320 and is to establish a secure tunnel with SGW 375.

Establishment of a secure IPsec tunnel may be facilitated by the extensible authentication protocol (EAP)-subscriber identity module (SIM) authentication mechanism, e.g., such as that described in the UMA Stage 2 R.1.0.x specification.

IPsec tunnel establishment is invoked by the MS initiating an Internet Key Exchange (IKE) (step 502) that may include an MS identity, such as an International Mobile Subscriber Identity (IMSI). The SGW may then reply to the MS with an IKE response message (step 504). The authenticating process is then initiated (step 506). SGW 375 then sends an EAP response/identity message that contains an identity of MS 310, e.g., the IMSI associated with MS 310, to the AAA server (step 508) which invokes the EAP-SIM authentication procedure. The AAA server identifies the MS based on the MS identity and sends an EAP Request/SIM-Start message to SGW 375 (step 510) which, in turn, forwards the EAP Request/SIM-start message to MS 310 (step 512). The MS then generates a SIM-Start Response message and transmits the SIM-Start Response message to SGW 375 (step 514). The SIM-Start Response message may include a randomly generated value, e.g., a NONCE value, that is used for network authentication. SGW 375 then sends the Response/SIM-Start message to the AAA server (step 516).

The AAA server then requests authentication data from the HLR of MS 310 or, alternatively, may access cached authentication data of MS 310. Once the authentication data is obtained by the AAA server, the AAA server generates an EAP-SIM/Challenge message with multiple randomized challenges. The EAP-SIM/Challenge message may include a message authentication code (MAC) having a master key generated, at least in part, on cipher keys and the randomized value generated by the MS and transmitted to the AAA server in the SIM-Start Response message. The SIM/Challenge message is then transmitted to SGW 375 (step 518), and SGW 375 forwards the SIM/Challenge message to MS 310 (step 520). MS 310 then runs the EAP/SIM algorithm and generates an EAP Response/SIM-Challenge message containing a calculated MAC and subsequently transmits the EAP Response/SIM-Challenge message to SGW 375 (step 522). SGW 375 forwards the EAP Response/SIM-Challenge message to the AAA server (step 524). The AAA server then verifies the MAC of the Response/SIM-Challenge and, assuming the MS is successfully authenticated, transmits an EAP Success message to SGW 375 (step 526). SGW 375 may then retrieve an available remote IP address from the remote IP address pool allocated to SGW 375. The remote IP address is then associated with MS 310, and SGW 375 forward the EAP Success message including the remote IP address to MS 310 (step 528). IKE signaling may then be completed by transmission of an IKE authentication message from MS 310 to SGW 375 (step 530), and transmission of an IKE authentication response message from SGW 375 to MS 310 (step 532). A secure association is thus established between MS 310 and SGW 375 for data tunneling therebetween. After completion of the tunnel establishment, the MS may then proceed with a discovery/registration routine.

Returning again to step 528 and with reference to FIG. 3, SGW 375 may maintain an association between a remote IP address assigned to MS 310 and an identity, such as the IMSI, of the MS. Additionally, an association of the logical or transport address assigned to the MS may be recorded as well. For example, SGW 375 may insert a record 396 having the remote IP address assigned to MS 310 at step 528 and the secure tunnel allocated to MS 310 as an index or key field 396a of record 396 in SA DB 395. Additionally, record 396 may include an MS identity field, such as IMSI field 396b, that records an identity (such as an IMSI) of MS 310. In the present example, the IMSI of MS 310 is represented as "IMSI:A" for illustrative purposes. Record 396 may also include a logical address field 396c that maintains a logical address, such as a transport IP address, assigned to MS 310. In the illustrative example, MS 310 is shown to have been assigned a transport IP address of 216.76.81.130. In this manner, record 396 provides a record of an association between a remote IP address assigned to an MS and a secure tunnel assigned to the MS, an MS identity, and a logical address assigned to the MS. Other MSs for which SGW 375 establishes secure tunnels may have a respective record maintained in SA DB 395 similar to record 396 shown for MS 310.

Figure 6:
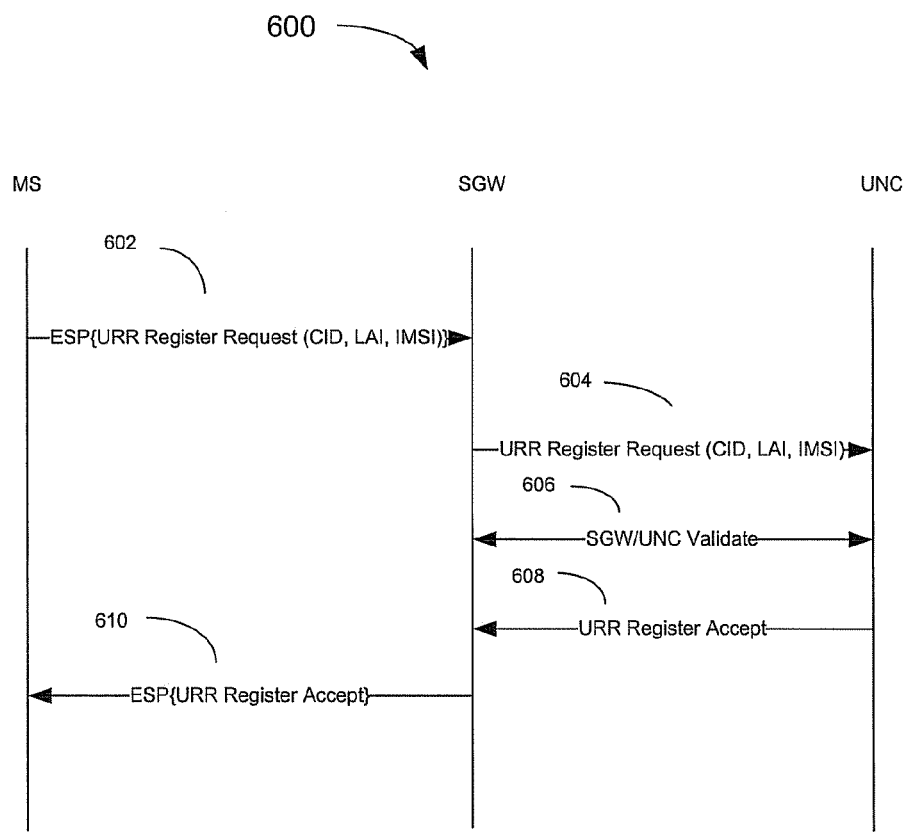
FIG. 6 is a diagrammatic representation of an embodiment of a signaling flow for performing discovery and registration of a mobile station in an unlicensed mobile access network.

FIG. 6 is a diagrammatic representation of an embodiment of a signaling flow for performing discovery and registration of an MS in UMA network 300. The registration procedure is invoked by MS 310 generating and issuing a UMA-RR (URR) Register Request message to SGW 375 via an established tunnel, e.g., a tunnel established in a manner described above with respect to FIG. 5 or by way of another suitable tunneling mechanism (step 602). The URR register request is transmitted to SGW 375 as ESP data in the encrypted portion of an IPsec packet formatted similar to data structure 400 described above. The URR Register request may include a cell identity (CID) that species a radio access network cell in which MS 310 is camped or, alternatively, a cell identity where the MS successfully registered. The cell identity may be implemented as a Cell Global Identification (CGI). Additionally, the URR Register Request may include a location area identification (LAI), and an international mobile subscriber identity (IMSI) of MS 310.

The URR Register Request is received by SGW 375 and is decrypted thereby, and the decrypted URR Register Request data is forwarded to UNC 340 (step 604). The source address of the decrypted URR Register Request forwarded to UNC 340 is the remote IP address assigned to MS 310. On receipt of the URR Register Request information, the UNC and SGW may engage in a validation procedure (step 606) over interface 385 depicted in FIG. 3. Various validation steps may be performed during the procedure of step 606 and may be carried out over a security association-International Mobile Subscriber Identity (SA-IMSI) application interface deployed on SGW-UNC interface 385 as described more fully hereinbelow. The validation step(s) of step 606 provide a mechanism for the UNC to verify that the identity (e.g., IMSI) and the transport IP address of an MS registering with the UNC correspond to an authenticated MS. More particularly, the validation step(s) of step 606 provide mechanisms for verifying that and IMSI used for a registration transaction matches the identity used to establish an IPsec tunnel. Assuming the MS is validated, a URR Register Accept message may be sent from the UNC to the SGW (step 608), and a corresponding URR Register Accept message may be encrypted by SGW and tunneled to the MS (step 610).

The architectural separation of UNC 340 and SGW 375 requires the two devices to share certain information. Conventional UMA implementations are based on the assumption that the two entities are collocated. In a network architecture implemented in accordance with embodiments disclosed herein, SGW-UNC interface 385 facilitates SGW-UNC communications by way of a core protocol and application specific messages that may carry IMSI information and dynamic access control lists (ACLs). More generally, the SGW-UNC interface is adapted to carry information associated with specific IPsec tunnels (and entities, such as a terminating MS, associated therewith).

SGW-UNC interface 385 may be used as a transport for application specific interfaces. Each application specific interface may define additional message type to carry application data. Application specific interfaces may each share the features of the core protocol, such as a common message header format, connection management, handshake, heartbeat, etc. Two exemplary application specific interfaces are described herein, namely a security association (SA)-IMSI interface and an admission policy interface. Other application interfaces may be defined and implemented on SGW-UNC interface 385.

Figure 7:
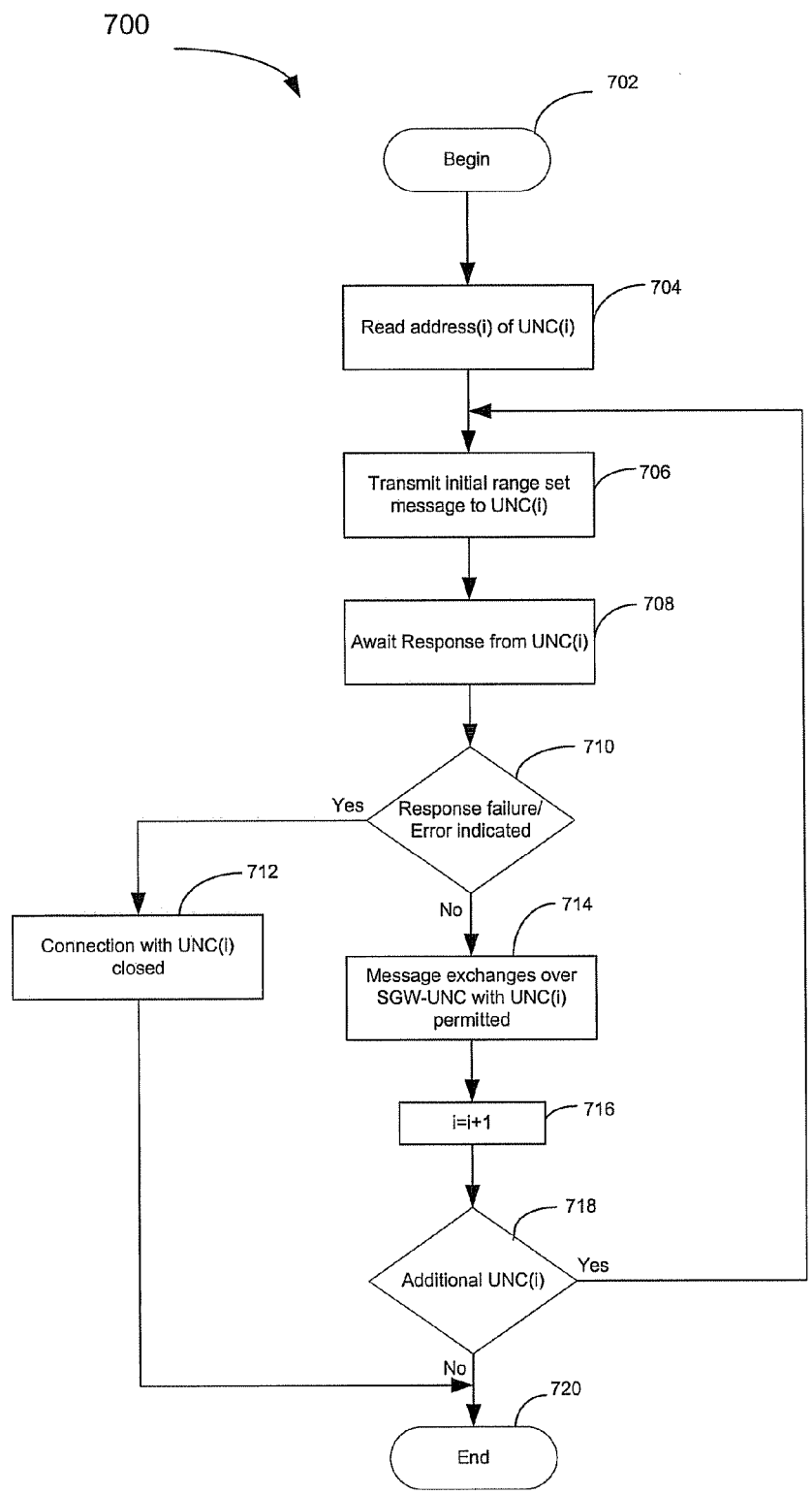
FIG. 7 is a flowchart depicting an embodiment of a security gateway-unlicensed mobile access network controller interface initialization routine.

FIG. 7 is a flowchart depicting an embodiment of an SGW-UNC interface initialization routine. The SGW-UNC interface initialization routine may be implemented as a set of computer-executable instructions tangibly embodied on a computer-readable medium that are run by a processing unit of an SGW.

On start up (step 702) of the SGW, the SGW reads an IP address(i) of a UNC(i) with which the SGW may connect (step 704). The SGW may then generate an initial range-set message that specifies the available range of IP addresses of the SGW's tunnel address pool that may be assigned as remote IP addresses to MSs. The SGW transmits the initial range-set message to UNC(i) (step 706). The SGW then awaits a response from the UNC(i). UNC(i), in response to receipt of the range-set message, may record the address range, for example, in a table in association with an identifier (e.g., the IP address) of the SGW. Additionally, the range set message may include an identifier of the protocol version supported by the SGW.

The SGW then evaluates whether an error was encountered (step 710). For example, the SGW may be configured to wait for an appropriate response from UNC(i) for a predefined interval after which the SGW-UNC interface initialization is designated as in error. Alternatively, an error code may be included in a response from the UNC(i). In the event an error condition or non-response is evaluated at step 710, the connection with UNC(i) may be closed (step 712), and the SGW-UNC interface initialization routine cycle may end (step 720). In this instance, the SGW may reattempt initialization of the SGW-UNC interface at a later time.

Returning again to step 710, in the event that no failure or error condition is evaluated, message exchanges over the SGW-UNC interface with the UNC(i) may commence (step 714). An index i may then be incremented (step 716), and an evaluation may be made to determine if another UNC(i) remains for establishment of a SGW-UNC interface (step 718). If an additional UNC(i) remains, the SGW-UNC interface initialization routine may return to transmit the initial range-set message to the UNC(i) according to step 706. Alternatively, the initialization routine cycle may end according to step 720.

The processing sequence described in FIG. 7 is provided for illustrative purposes only and is not intended to denote serialization of the described processing steps. In various embodiments, the processing steps described in FIG. 7 may be performed in varying order and may be performed concurrently. For example, a set of UNC addresses may be read and each of the UNCs may be addressed in a common initial range-set message. Execution of some processing steps of FIG. 7 may be excluded without departing from embodiments disclosed herein.

In one embodiment, the SGW-UNC interface is implemented using TCP over Ipv4 although other protocols may be suitably substituted therefore. If more than one SGW-UNC application is concurrently running, each application is preferably assigned a unique source port.

Messages exchanged over the SGW-UNC interface may share one or more common fields and, depending on the message type, may include fields unique to the particular message type. FIG. 8 is a diagrammatic representation of an embodiment of an exemplary format of an SGW-UNC message 800. Message 800 includes a length field 810 that contains a data element, such as a short integer, that specifies a length of message 800. The length may be expressed in bytes, octets, or another suitable length quantification metric. Length field 810 may be of a predefined size, such as a 2-octet field. A message type field 820 includes a data element, such as a short integer, that specifies a message type of message 800. Message type field 820 may be of a predefined size, such as a 2-octet field. A payload field 830 cares data that may be particular to the message type of message 800. Payload field 830 may include data element(s) of one or more data types and may be variable in size.

Various message types may be defined dependent on the deployment of applications or services provisioned over the SGW-UNC interface. Three exemplary message types include a range-set message for identifying a range of addresses available to the SGW for tunneling as described above, a configuration message that facilitates configuration of the SGW-UNC interface, and a heartbeat message type that may be periodically exchanged between the SGW and UNC to provide an indication that the SGW-UNC is in a functional state. Table A summarizes the exemplary message types and a corresponding message type code that may be included in type field 820 of message 800.

TABLE A

| Type | Code |
|---|---|
| Range-Set | 0 |
| Configuration | 1 |
| Heartbeat | 2 |

FIG. 9 is a diagrammatic representation of a format 900 of payload field 830 that may be implemented for message 800 of type Range-Set.

Payload field 830 may include a version field 902 that contains a data element, such as a short integer, that may specify a version of the SGW-UNC interface. An addressing domain field 904 may include a data element, such as a short integer, that indicates whether addresses specified by message 800 are to be interpreted as IPv4 or IPv6 (or another future IP version) addresses. SGW public address field 906 may include a data element, such as a binary date element, that specifies the public address of the SGW. One or more pairs of a range start fields 908a-908n and range end fields 910a-910n include data elements that identify a respective start address and an end address of an address range available to the SGW for tunneling are also included in payload field 830. For example, start field 908a may include a binary data element that specifies a first IP address of an address pool available to the SGW for assignment to MSs, and end field 910a may include a binary data element that specifies a last IP address of a range spanning the start and end addresses defined by fields 908a and 910a. A single start and end field pair may be included in payload field 830 in the event the address pool comprises a contiguous address range. Alternatively, two or more start and end field pairs may be included in payload field 830 as shown in FIG. 9. It should be understood that addresses of the remote IP address pool range available to an SGW may be assigned to a MS and to a tunnel allocated for the MS. In accordance with an embodiment, the UNC, on receipt of a Range-Set message, records the remote IP address range of the SGW in a Remote IP-SGW database 345 (shown in FIG. 3) maintained or interfaced thereby. For example, UNC 340 may read the remote IP address range(s) defined by one or more range start field and end field pairs and write the remote IP address ranges available to the SGW that originated the Range-Set message to a record of database 345. A record of database 345 that maintains the remote IP address ranges available to an SGW may include the remote IP address range(s) and an identity of the associated SGW (or, alternatively, an identity of the SGW-UNC interface used for exchange of messages with the SGW). In one implementation, an identity of an SGW-UNC interface may comprise an IP address and port number associated with the interface.

FIG. 10 is a diagrammatic representation of a format 1000 of payload field 830 that may be implemented for message 800 of type Configuration. A (Configuration type message may be generated and transmitted by a UNC to an SGW in response to receipt of a Range-Set message by the UNC.

Payload field 830 may include a status code field 1002 that contains a data element, such as a short integer, that may specify a status code identifying a processing status of the Range-Set message. Table B summarizes exemplary status codes that may be included in status code field 1002.

TABLE B

| Status Code | Meaning |
|---|---|
| 0 | Okay |
| 1 | Unknown Error |
| 2 | Unsupported Version |
| 3 | Range Error |
| 4 | Bad Range-Set Message |
| 5+ | Reserved |

In the present example, a status code "0" indicates that the Range-Set message has been received by the SGW and was properly processed. That is, a configuration message with a status code "0" indicates the SGW-UNC interface has been properly initialized on the UNC end and may be engaged for normal message exchanges. A status code "1" may indicate that an unknown or otherwise undiagnosed error has occurred during initialization of the SGW-UNC interface. A status code "2" may indicate that the interface version asserted in the Range-Set message is not supported by the UNC. A status code "3" may indicate an error was detected by the UNC in the address range specified in the Range-Set message. A status code "4" may indicate the Range-Set message received by the UNC is unintelligible. Status codes of "5" or higher may be reserved, and one or more available reserved status codes may be implemented for future expansion of the SGW-UNC functionality.

Additionally, payload field 830 may include a version field 1004 that contains a data element, such as a short integer, that identifies a protocol version of the SGW-UNC interface. In one implementation, the UNC may be configured to set the protocol version to the version specified by the SGW in version field 902 of the Range-Set message if the version is supported by the UNC. If the UNC does not support the version specified by the SGW, the protocol version specified by version field 1004 may be set to the highest version supported by the UNC.

A heartbeat expiration field 1006 may contain a data element, such as an integer, that specifies an interval, such as a number of seconds, at which heartbeat messages are to be transmitted across SGW-UNC interface.

A heartbeat mechanism may be implemented to provide an indication to the SGW and UNC that the SGW-UNC interface is maintained in an operational state. A message 800 having a type heartbeat is used for implementing the heartbeat mechanism. In an exemplary embodiment, a heartbeat message may comprise a message 800 that excludes payload field 830. That is, a heartbeat message may only include a length field and a type field that specifies the message as a heartbeat message. Preferably, both the SGW and UNC may transmit a heartbeat message. To this end, each of the SGW and the UNC may maintain a heartbeat timer. The heartbeat timer may be initialized to a predefined expiration, e.g., 3 seconds. The heartbeat timer may be reset each time a message is sent on the SGW-UNC interface. If the timer expires prior to a message being sent on the SGW-UNC interface, a heartbeat message may be transmitted on the SGW-UNC interface. If either the SGW or UNC fails to receive a message from its peer for a period that exceeds the assigned heartbeat timer expiration, the expiration is treated as a transport error. In another embodiment, the heartbeat mechanism may be disabled. In accordance with another embodiment, an SA-IMSI interface is implemented on the core SGW-UNC interface to facilitate sharing of information about an IMSI associated with a particular tunnel. Particularly, the SA-IMSI interface facilitates verification that the binding (IMSI and transport IP address of an MS) received in the URR REGISTER REQUEST (step 604 of FIG. 6) is the same as the one that the MS used as identity for the authentication procedure depicted in FIG. 5 for establishment of an IPsec tunnel allocated to the MS.

Additionally, the SA-IMSI interface carries information to allow the UNC to direct the SGW to tear down a particular tunnel. The SA-IMSI interface may be implemented as additional message types transported on the core SGW-UNC interface. Table C summarize various exemplary SA-IMSI message types.

TABLE C

| Type | Code |
|---|---|
| Tunnel-Query | 3 |
| Tunnel-Info | 4 |
| Tunnel-Out-of-Range | 5 |
| Tunnel-Release | 6 |

A tunnel-query message may be originated by the UNC and transmitted to the SGW. FIG. 11 is a diagrammatic representation of a format 1100 of payload field 830 that may be implemented for message 800 of type Tunnel-Query.

Payload field 830 may include an addressing domain field 1102 that has a data element, such as a short integer, that indicates whether addresses specified by message 800 are to be interpreted as IPv4 or IPv6 (or another future IP version) addresses. A tunnel address field 1104 may include a data element, such as a binary value, that species an IP address assigned to the tunnel. The IP address assigned to the tunnel may comprise the remote IP address assigned to the MS for which the tunnel is allocated.

The UNC may generate and transmit a Tunnel-Query message whenever the UNC desires to learn tunnel information associated with a particular tunnel address. The UNC sends the tunnel-Query message on the TCP connection on which the Range-Set message was received.

FIG. 12 is a diagrammatic representation of a format 1200 of payload field 830 that may be implemented for message 800 of type Tunnel-Info. A Tunnel-Info message may be generated by the SGW as a result of receipt of a tunnel-Query message and transmitted to the UNC that originated the Tunnel-Query message.

Payload field 830 may include a tunnel address field 1202 that has a data element, such as a binary value, that specifies an IP address assigned to the tunnel, e.g., the remote IP address assigned to the MS for which the tunnel is allocated. An MS address field 1204 may include a data element, such as a binary value, that specifies a transport IP address assigned to the MS associated with the tunnel. If the tunnel is not in use, MS field 1204 may carry a null value. IMSI field 1206 may include a data element, such as an octet stream, that specifies an IMSI of an MS assigned to the specified tunnel. The IMSI value of IMSI field may be implemented in network access identifier (NAI) format. IMSI field 1206 may be nulled in the event the specified tunnel is not in use.

FIG. 13 is a diagrammatic representation of a format 1300 of payload field 830 that may be implemented for message 800 of type Tunnel-Out-of-Range. A Tunnel-Out-of-Range message may be generated by an SGW responsive to receiving a Tunnel-Query message from a UNC that specifies a tunnel address out of the range of the SGW.

Payload field 830 may include an addressing domain field 1302 that contains a data element, such as a short integer, that indicates whether addresses specified by message 800 are to be interpreted as IPv4 or IPv6 (or another future IP version) addresses. A tunnel address field 1304 may contain a data element, such as a binary value, that specifies the IP address of the tunnel.

FIG. 14 is a diagrammatic representation of a format 1400 of payload field 830 that may be implemented for a message 800 of type Tunnel-Release. A Tunnel-Release message may be generated by a UNC and transmitted to an SGW to direct the SGW to tear down a particular tunnel.

Payload field 830 may include an addressing domain field 1302 that contains a data element, such as a short integer, that indicates whether addresses specified by message 800 are to be interpreted as IPv4 or IPv6 (or another future IP version) addresses. A tunnel address field 1304 may contain a data element, such as a binary value, that specifies the IP address of the tunnel to be tore down.

In accordance with another embodiment, an admission policy interface may be implemented and run over the core SGW-UNC interface. The admission policy interface may be run over a separate TCP connection than that over which the SA-IMSI interface is run. In this manner, the admission policy interface may be optionally included or excluded. Moreover, performance of the admission policy interface is latency sensitive. By optionally implementing the admission policy on a separate TCP connection from the SA-IMSI interface, TCP head-of-line blocking issues may be averted.

The SGW may have a locally defined static routing policy. The admission policy interface allows dynamic rules to be configured in addition to those allowed by the static policy. Dynamic rules define additive permission—that is, a dynamic rule may allow a flow that was not allowed by the static rules, but it may not deny a flow that is allowed under the static policies.

All rules associated with a particular tunnel are invalidated when the tunnel is torn down. When a new tunnel is established, the policy defaults to the static policy rules until any dynamic rules are added for it. Table D summarizes exemplary rules that may be dynamically implemented in accordance with the admission policy:

TABLE D

| Rule Name | Type | Octets | Comment |
|---|---|---|---|
| Remote Address | Binary | 4 | 32 bit IPv4 Address assigned to the tunnel. |
| Remote Port | Integer | 4 | Allowed port. May logically indicate a source or destination port depending on the direction parameter. A value of zero indicates all ports allowed. |
| Peer Address/Network | Binary | 4 | 32 bit IPv4 Address. May represent an address or network depending on the net mask |
| Peer Network Mask | Binary | 4 | 32-bit IPv4 address mask. |
| Peer Port | Integer | 4 | Allowed peer port. May logically indicate a source or destination port depending on the direction parameter. A value of zero indicates all ports allowed. |
| Transport Protocol | Byte | 1 | Use standard values from IP Header protocol field definition. |
| Direction | Byte | 1 | 0 indicates data flowing from tunnel to network, 1 indicates the reverse. |
| Classification | Byte | 1 | 0—RTP<br>1—RTCP<br>255—other<br>Values 2-254 reserved for future expansion. |
| Bandwidth policing | Byte | 1 | 0—disabled.<br>1—enabled. |

TABLE D-continued

| Rule Name | Type | Octets | Comment |
|---|---|---|---|
| Bit rate limit | Integer | 4 | Maximum bit rate in kilobits per second. Ignored if bandwidth policing is disabled. |

The rules described in TABLE D, as well as the data types and sizes thereof, are illustrative only and are provided to facilitate an understanding of disclosed embodiments.

Each rule defines a flow in one direction, and thus bi-directional flows require two rules. For flows from the tunnel to the network, a tunnel port is assigned as the source port, and the peer address and port range indicate the destination. For flows from the network to the tunnel, the peer address and port range indicate the source, and the tunnel port designates the destination.

Multiple rules may be specified in a single request. If more than one rule is present in a request, the rules may be treated atomically—that is, either all rules are accepted or all rules are rejected. A plurality of rules sent in a single request may be considered a rule-set. Preferably, rule assertions do not nest. Thus, a rule may be removed in a single request even if the rule has been asserted multiple times.

In accordance with an embodiment, the admission policy includes two types of messages: Policy Request messages and Policy Response messages. Table E summarize the exemplary Admission Policy message types. Admission Policy interface messages may be implemented according to the message format depicted and described above with reference to FIG. 8.

TABLE E

| Type | Code |
|---|---|
| Policy Request | 7 |
| Policy Response | 8 |

FIG. 15 is a diagrammatic representation of a format 1500 of payload field 830 that may be implemented for message 800 implemented according to the Admission Policy interface and having a message type Policy Request. A Policy Request message may be generated by a UNC and transmitted to the SGW to direct the creation or tear down of one or more rules. If more than one rule is specified in the Policy Request message, all specified rules may be required to succeed or fail.

Payload field 830 may include a transaction identifier (ID) field 1502 that contains a data element, such as an integer, that is used to identify the request. The transaction ID specified by transaction ID field 1502 may be set to "0" on a first policy request transmitted on a connection and may be incremented for each request thereafter. Rollover of the transaction ID when all available transaction IDs have been consumed may be permitted. An addressing domain field 1504 may be included in payload field 830 that contains a data element, such as a short integer, that indicates whether addresses specified by message 800 are to be interpreted as IPv4 or IPv6 (or another future IP version) addresses. An operation field 1506 may include a data element, such as a binary value, that indicates whether the Policy Request message is a request to add or delete rule(s) specified in a rule field 1508. For example, a binary "0" value of operation field 1506 may indicate the Policy Request message is a request to add one or more rules, and a binary "1" value of operation field 1506 may indicate the Policy Request message is a request to delete one or more rules. Rule field 1508 may include identifiers, such as rule names, of one or more rules to be added or deleted. For example, one or more rules identified above in TABLE D may be specified in rule field 1508.

FIG. 16 is a diagrammatic representation of a format 1600 of payload field 830 that may be implemented for message 800 implemented according to the Admission Policy interface and having a message type Policy Response. A Policy Response message may be generated by an SGW in response to receipt of a Policy Request message and may be transmitted to the UNC.

Payload field 830 may include a transaction ID field 1602 that includes the transaction ID read from a Policy Request message. A status field 1604 may include a data element, such as a short integer, that provides an indication of the status of the corresponding policy request. TABLE F summarizes various exemplary values that may be assigned to status field 1604 dependent on the result of the SGW's attempt to implement the requested policy.

TABLE F

| Status Value | Meaning |
|---|---|
| 0 | Success |
| 1 | Tunnel not active |
| 2 | Tunnel address not assigned to the SGW |
| 3 | Too many rules |
| 4 | Attempt to delete a non-existent rule |
| 5 | Bad request |
| 6 | Unexpected Error |

The status values described in TABLE F are illustrative only and other status values and corresponding interpretations may be used in lieu of, or in combination with, those described.

Figure 17:
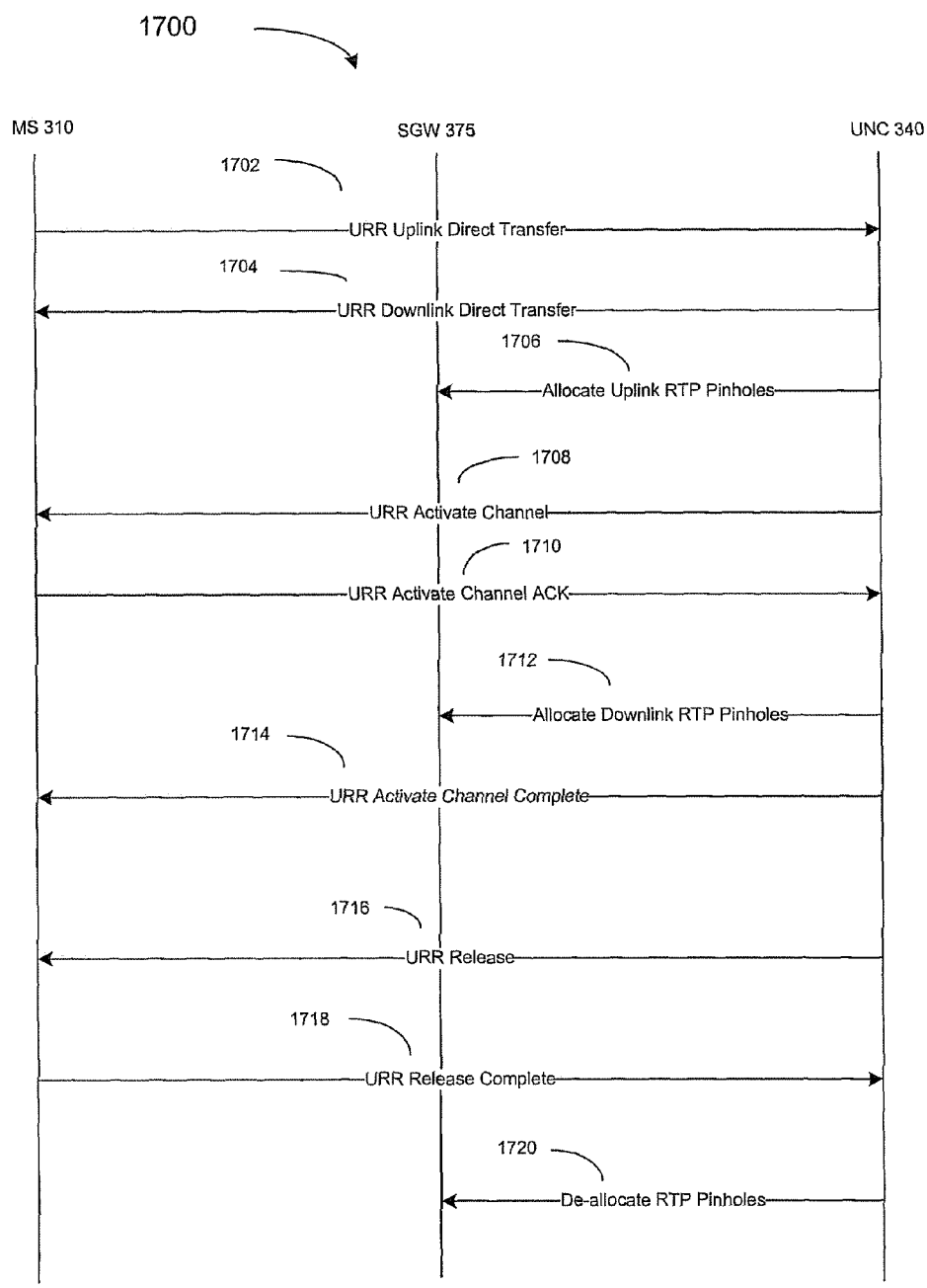
FIG. 17 is a diagrammatic representation of an embodiment of a signaling flow that facilitates call set-up in a unlicensed mobile access network.

FIG. 17 is a diagrammatic representation of an embodiment of a signaling flow that facilitates call set up in a UMA network. The call set up procedure depicted in FIG. 17 may be invoked after establishment of a secure tunnel between a dual mode MS and an SGW.

The MS invokes the call set-up procedure by generating and transmitting an uplink direct transfer message to the UNC (step 1702). A URR downlink direct transfer message is then returned to the MS from the UNC (step 1704). The UNC then directs the SGW to allocate or assign uplink pinholes for defining admission policies or rules to be applied to media data (step 1706), e.g., encoded voice data. As referred to herein, a pinhole comprises one or more admission policies or rules that define criteria for allowing transport of data through a network entity, e.g., SGW 375. For example, a pinhole may specify an admission policy of data packets requiring the data packets to have a particular source/destination address and port and a particular data protocol. In the event that one or more of the criteria are not met by the criteria defined by the pinhole, the data may be blocked at the SGW.

A URR Activate Channel message is then generated by the UNC and transmitted to the MS (step 1708), and the MS acknowledges receipt of the URR Activate Channel message (step 1710). Responsive to receipt of the URR Activate Channel acknowledgment, the UNC sends a downlink allocation message to the SGW directing the SGW to allocate pinholes for transport of media on the downlink channel (step 1712). A URR Activate Channel Complete message is then generated by the UNC and transmitted to the MS (step 1714). The MS may then engage in a media session over the tunnel.

When the media session is complete, the UNC may generate and transmit a URR. Release message to the MS (step 1716), and the MS may reply to the UNC with a URR Release Complete message (step 1718). The UNC may then generate and transmit a De-allocation message to the SGW directing the SGW to de-allocate all pinholes previously allocated for the media session (step 1720).

Figure 18A:
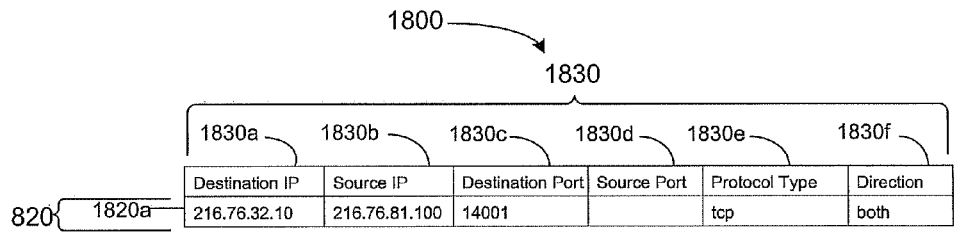
FIGS. 18A-18C are respective diagrammatic representations of an embodiment of an access control table generated or modified during call set-up that facilitates dynamic session security.
Figure 18B:
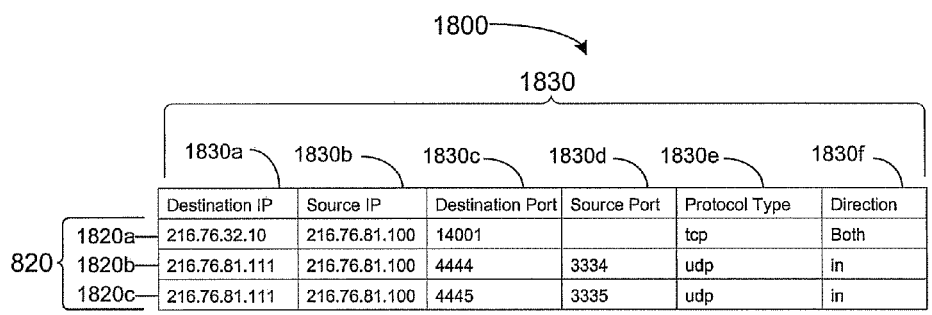
Figure 18C:
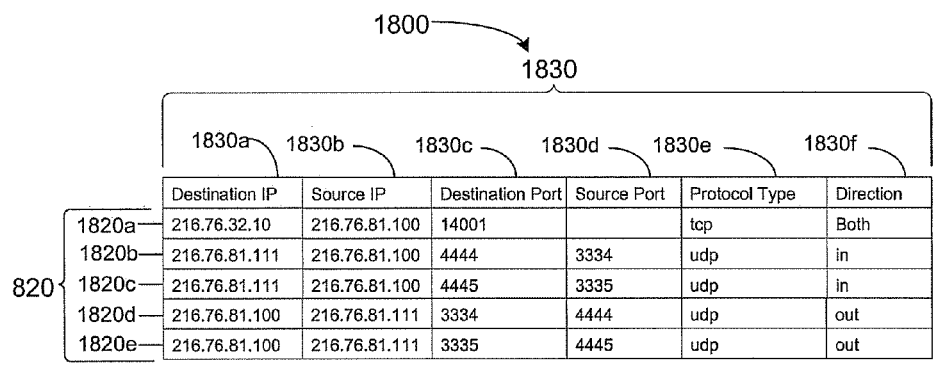

In accordance with another embodiment, dynamic session security may be implemented in conjunction with the call set-up to provide a security enforcement point at the SGW. With reference now to FIGS. 18A-18C, a diagrammatic representation of an embodiment of an access control table 1800 generated or modified during call set-tip that facilitates dynamic session security is shown.

Table 1800 comprises a one or more records 1820 and fields 1830. Table 1800 may be generated by SGW 375, maintained on a storage medium connected or otherwise interfaced with SGW 3757 fetched therefrom, and processed by a processor of SGW 375. Each record 1820a, or row, comprises data elements in respective fields 1830a-1830f (collectively referred to as fields 1830).

Fields 1830a-1830f have a respective label, or identifier, that facilitates insertion, deletion, querying, or other data operations or manipulations of table 1800. In the illustrative example, fields 1830a-1830f have respective labels of "Destination IP", "Source IP", "Destination Port", "Source Port," "Protocol Type," and "Direction." Data elements of a particular field 1830a-1830f may share a common data type, e.g., string, integer, float, binary, etc.

In the present example, assume MS 310 has a remote IP address of 216.76.81.100, UNC 340 has an IP address of 216.76.32.10, and SGW has an IP address of 216.76.81.105 as shown in FIG. 3. Further assume that a call-set up depicted in FIG. 17 configures the call for transmission of session data to and from MS 310 through a media gateway (MGW) 390 having an IP address 216.76.81.111 as shown in FIG. 3. It is understood that MGW 390 may interconnect with other network infrastructure, networks, or user devices to terminate a session between MS 310 and another device. A device with which MS 310 may engage in a call session is not shown to simplify the illustration and the description of the present embodiment.

SGW 375 may generate table 1800 comprising record 1820a and fields 1830a-1830f after tunnel establishment between MS 310 and SGW 375. Field 1830a indicates MS 310 (identified by way of the source IP address 216.76.81.100 in field 1830b) may only send data to the destination IP address of 216.76.32.10, that is to UNC 340, through SGW 375. Field 1830c indicates that messages transmitted to UNC 340 from MS 310 must have a destination port 14001 to allow admission of the messages. Field 1830e specifies a protocol type of TCP thereby indicating that only data exchanges between the MS and UNC carried over TCP are currently allowed. Field 1830f indicates that the security policy defined by record 1820a is valid for exchanges in both directions of the link, that is to and from MS 310.

After SGW 375 is directed to allocate uplink pinholes for the impending call being set-up as indicated in step 1706 of FIG. 17, SGW 375 may insert records 1820b and 1820c in table 1800 as shown in FIG. 18B. Record 1820b provides a security policy for media data, such as voice data over RTP, on an uplink and record 1830d provides a security policy for the media transport control, e.g., RTCP data, on the uplink. Particularly, fields 1830a-1830d of record 1820b indicate that media data may be transmitted from a port 3334 of MS 310 (identified by source IP address 216.76.81.100 in field 1830b) to a port of 4444 of a device having an IP address of 216.76.81.111, that is to MGW 390. Likewise, fields 1830a-1830d of record 1820c indicate that media control data may be transmitted from port 3335 of MS 310 to port 4445 of MGW 390. Field 1830e of records 1820b and 1820c indicates the media data and media control data are only permitted to be carried over UDP. Field 1830f of records 1820b and 1820c indicates the flow direction of the policy defined by records 1820b and 1820c, namely that the policy is enforced for flows into MGW 390.

After insertion of records 1820b and 1820c, SGW 375 is configured to enforce the defined security on the uplink, that is from MS 310 to SGW 375. Data received from MS 310 that does not conform to the policies defined by records 1820a-1820c may be blocked from transmission into the network.

Continuing with the present example, when SGW 375 is directed to allocate downlink pinholes for the impending call being set-up as indicated in step 1712 of FIG. 17, SGW 375 may insert records 1820d and 1820e in table 1800 as shown in FIG. 18C. Record 1820d provides a security policy for media data on a downlink and record 1830f provides a security policy for the media transport control on the downlink. Particularly, fields 1830a-1830d of record 1820d indicate that media data may be transmitted to a port 3334 of MS 310. The media data may be originated from a port 4444 of MGW 390 identified by the source IP address 216.76.81.111 of field 1830b. Likewise, fields 1830a-1830d of record 1820e indicate that media control data may be transmitted to port 3335 of MS 310 from a port 4445 of MGW 390. Field 1830e of records 1820d and 1820e indicates the media data and media control data are only permitted to be carried over UDP. Field 1830f of records 1820d and 1820e indicates the flow direction of the policy defined by records 1820d and 1820e, namely that the policy is enforced for flows out of SGW 375, that is on the downlink to MS 310.

After insertion of records 1820d and 1820e, SGW 375 is configured to enforce the defined security on the downlink to MS 310. Data received at SGW 375 directed to MS 310 that does not conform to the policies defined by records 1820d-1820e may be blocked from transmission to MS 310.

As described, a system, method, and interface for segregating a network controller and a security gateway are provided. An SGW-UNC interface is established between a UNC and an SGW. One or more application interfaces are carried over the SGW-UNC interface. An admission policy interface may be maintained on the SGW-UNC interface that allows establishment of dynamic access control lists for admission policies applied on specific secure tunnels. Additionally, a security association-international mobile subscriber identity interface may be maintained on the SGW-UNC interface that facilitates validating an IMSI used during a registration process matches an identity used to establish a tunnel. Thus, an MS validation mechanism is provided over the SGW-UNC interface that couples the UNC and SGW.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory in a SGW and/or a UNC, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

While the descriptions of a shared resource network, devices operating therein, and wireless medium transmissions made within the shared resource network are provided herein according to UMA implemented on and IEEE 802.11 compliant network and GSM protocols, functionality, and nomenclature, such examples are illustrative only and implementations of the invention are not limited to any particular network, network-compliant device, or network communication formats or protocols. Furthermore, descriptions of the invention provided herein in relation to implementations in an IEEE 802.11 conformant network are illustrative only and are provided only to facilitate an understanding of the invention. Embodiments of the present invention may be implemented on other wireless or fixed network architecture and devices that utilize packet transmission mechanisms for effecting data communications.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

What is claimed is:

1. A security gateway for deployment in a packet network in communication with a mobile station and a network controller interface, the security gateway comprising:
    a security gateway-network controller interface adapted to be coupled with a network controller external to the gateway; and
    a hardware processing unit adapted to execute an instruction set tangibly embodied on a computer-readable medium, wherein the processing unit implements at least one application interface on the security gateway-network controller interface,
    wherein upon initialization of the security gateway-network controller interface the hardware processing unit (i) generates a range-set message that specifies a range of private Internet-protocol addresses available to the security gateway and assignable by the security gateway to the mobile station in order to establish a secure connection with the mobile station and (ii) transmits the range-set message to the network controller to initiate a communication session between the security gateway and the network controller,
    wherein the security gateway assigns at least one of the private Internet protocol addresses from the range of private Internet-protocol addresses to the mobile station to establish the secure connection with the mobile station.

2. The security gateway of claim 1, wherein the at least one application interface comprises an admission policy interface.

3. The security gateway of claim 1, wherein the at least one application interface comprises a security association-international mobile subscriber identity interface.

4. The security gateway of claim 1, wherein the at least one application interface comprises an admission policy interface maintained on a first transmission control protocol connection, and a security association-international mobile subscriber identity interface maintained on a second transmission control protocol connection.

5. The security gateway of claim 1, wherein the processing unit maintains a timer set to a predefined interval.

6. The security gateway of claim 5, wherein the processing unit, in response to the timer expiring, generates a message and transmits the message on the security gateway-network controller interface.

7. The security gateway of claim 5, wherein the timer is decremented and, in response to the security gateway transmitting a message on the security gateway-network controller interface, is reset to the predefined interval.

8. The security gateway of claim 1, wherein the secure connection is terminated by the security gateway and the mobile station.

9. The security gateway of claim 8, wherein a release message is received by the security gateway on the security gateway-network controller interface that includes an Internet-protocol address from the range of private Internet-protocol addresses assigned to the secure connection, and wherein the security gateway releases the secure connection in response to receipt of the release message.

10. The security gateway of claim 1, wherein the security gateway is adapted to write one or more admission policy rules to an access control data structure in response to receiving a policy request message from the network controller on the security gateway-network controller interface.

11. The security gateway of claim 10, wherein a rule of the one or more admission policy rules specifies a maximum bandwidth available for data transmissions to or from a mobile station.

12. The security gateway of claim 10, wherein the processing unit is adapted to block a packet from transmission in the event that packet is not in conformance with a first rule of the one or more admission policy rules.

13. A method of registering a mobile station assigned to a secure tunnel in a packet network, comprising:
    initializing an interface between a security gateway and a network controller external to the security gateway by the security gateway sending a range-set message to the network controller to initiate a communication session between the security gateway and the network controller specifying a range of private Internet-protocol addresses available to the security gateway and assignable by the security gateway to the mobile station in order to establish the secure tunnel with the mobile station;
    receiving a registration request by the security gateway;
    informing the network controller located external to the security gateway of the registration request;
    engaging in a validation procedure over a security association-international mobile subscriber identity application interface established between the security gateway and the network controller; and
    assigning by the security gateway at least one private Internet protocol addresses from the range to the mobile station to establish the secure tunnel with the mobile station.

14. The method of claim 13, wherein engaging in a validation procedure further comprises transmitting, by the security gateway, to the network controller an identity of the mobile station assigned to the secure tunnel established between the mobile station and the security gateway.

15. The method of claim 14, wherein the identity comprises an international mobile subscriber identity.

16. The method of claim 14, wherein the identity is transmitted with an address of the secure tunnel and a transport address assigned to the mobile station.

17. A network for providing secure data communication, comprising:
- a first plurality of security gateways adapted to provision secure tunnels with mobile stations; and
- a second plurality of network controllers, wherein one or more of the first plurality of security gateways are communicatively coupled with one or more of the second plurality of network controllers over respective security gateway-network controller interfaces, and wherein each of the security gateway-network controller interfaces are adapted to implement at least one application interface thereon,
- wherein the one or more of the first plurality of security gateways prior to being communicatively coupled with the one or more of the second plurality of network controllers transmit a message to the one or more network controllers specifying a range of private addresses available to the one or more security gateways and assignable by the one or more gateways to at least one of the mobile stations to establish a secure connection with the at least one mobile station as part of initializing the respective security gateway-network controller interfaces and to initiate a communication session between the security gateway and the network controller;
- wherein the one or more of the first plurality of security gateways after being communicatively coupled with the one or more of the second plurality of network controllers assigns at least one private address from the range of private addresses to the mobile station to establish the secure connection with the mobile station.

18. The network of claim 17, wherein the at least one application interface comprises an admission policy interface.

19. The network of claim 17, wherein the at least one application interface comprises a security association-international mobile subscriber identity interface.

20. The network of claim 17, wherein the private addresses are Internet-protocol addresses.

* * * * *